United States Patent [19]

Canning

[11] 3,829,713

[45] Aug. 13, 1974

[54] CMOS DIGITAL DIVISION NETWORK

[75] Inventor: Michael L. Canning, Saratoga, Calif.

[73] Assignee: Intersil Incorporated, Cupertino, Calif.

[22] Filed: Feb. 12, 1973

[21] Appl. No.: 331,586

[52] U.S. Cl. .......... 307/225 C, 307/214, 307/224 C, 307/251, 328/46

[51] Int. Cl. .......... H03k 23/22

[58] Field of Search ........ 307/221 C, 223, 225, 205, 307/214, 251; 328/46

[56] References Cited

UNITED STATES PATENTS

| | | | |
|---|---|---|---|
| 3,593,032 | 7/1971 | Ma | 307/221 C |
| 3,745,372 | 7/1973 | Koster | 307/221 C |
| 3,749,937 | 7/1973 | Rogers | 307/223 |

OTHER PUBLICATIONS

Hastings, "Complementary Shift Register," Vol. 13, No. 2, July 1970, pp. 493–494, IBM Tech. Discl. Bull.

Gaensslen, "Complementary FET Dynamic Shift Register . . ." IBM Tech. Discl. Bull. Vol. 12, No. 12, May 1970, pp. 2144–2145.

Gaensslen, "Complementary Field Effect Transistor Dynamic Shift Register," IBM Tech. Discl. Bull. Vol. 12, No. 12, May 1970, pp. 2142–2143.

Shen, "Two–Way Four–Phase MOSFET Dynamic Shift Register," IBM Tech. Discl. Bull. Vol. 12, No. 12, May 1970 p. 2149.

*Primary Examiner*—Rudolph V. Rolinec
*Assistant Examiner*—L. N. Anagnos
*Attorney, Agent, or Firm*—Gregg, Hendricson & Caplan

[57] ABSTRACT

A CMOS dynamic division circuit employing only transmission gates and inverters minimizes the number of units required for any particular division, which then minimizes nodal capacitance for limiting power consumption. The circuit is particularly adapted for electronic watch circuits.

7 Claims, 8 Drawing Figures

TRUTH TABLE A

| TIME | GATE 11 | a | b | GATE 12 | c | d | e |
|---|---|---|---|---|---|---|---|
| $t_0$ | | 0 | 1 | | 0 | 1 | 0 |
| $t_1$ | 1 | 0 | 1 | 0 | 0 | 1 | 0 |
| $t_2$ | 0 | 0 | 1 | 1 | 1 | 0 | 1 |
| $t_3$ | 1 | 1 | 0 | 0 | 1 | 0 | 1 |
| $t_4$ | 0 | 1 | 0 | 1 | 0 | 1 | 0 |
| $t_5$ | 1 | 0 | 1 | 0 | 0 | 1 | 0 |
| $t_6$ | 0 | 1 | 0 | 1 | 1 | 0 | 1 |

TRUTH TABLE B

| TIME | GATE 11 | a | b | GATE 12 | c | d | e |
|---|---|---|---|---|---|---|---|
| $t_0$ | | 0 | 1 | | 0 | 1 | 0 |
| $t_1$ | 1 | 0 | 1 | 0 | 1 | 0 | 1 |
| $t_2$ | 0 | 1 | 0 | 1 | 1 | 0 | 1 |
| $t_3$ | 1 | 1 | 0 | 0 | 0 | 1 | 0 |
| $t_4$ | 0 | 0 | 1 | 1 | 0 | 1 | 0 |
| $t_5$ | 1 | 0 | 1 | 0 | 1 | 0 | 1 |
| $t_6$ | 0 | 1 | 0 | 1 | 1 | 0 | 1 |

CMOS DIGITAL DIVISION NETWORK

BACKGROUND OF INVENTION

Frequency division is employed in a variety of different applications such as, for example, frequency modulated transmitters, television transmitters and the like. A fairly recent development employing precision frequency division is the electronic watch where a very stable high frequency signal is generated with a crystal oscillator and this frequency is then divided down to one cycle per second to drive a motor rotating the watch hands.

It is known to provide frequency division in a variety of different ways. Thus, for example, there are employed relaxation oscillators such as multi-vibrators, flip-flop circuits and the like, and regenerative frequency dividers which generate a harmonic frequency that is combined with a fundamental frequency to produce a fractional frequency. There are additionally employed counter-circuits wherein a capacitor is charged in steps to some predetermined level for discharge.

With the advent of integrated circuits there have been developed integrated circuit or IC frequency dividers, and it is known to employ MOS and CMOS devices in these circuits. It has, in fact, become common to employ a CMOS master-slave flip-flop divider to provide the frequency division necessary for electronic watches. It has also been suggested that frequency division in an integrated circuit may be accomplished by the utilization of shift registers connected as a ring counter.

In addition to the general problems of frequency division many modern applications thereof pose further problems such as the necessity of limiting the physical size of the divider and of limiting the power consumption thereof. Particularly in the field of electronic watches, wherein the present invention is highly advantageous, it is necessary that the frequency divider occupy a minimum of space. Furthermore, with respect to this application it is necessary that the frequency divider operate on a very low threshhold voltage and consume a minimum amount of power inasmuch as the power is provided by a miniature battery. The present invention provides a circuit employing a lesser number of units or devices than prior art frequency dividers of equal capability so as to minimize the physical size of the present invention while at the same time minimizing the power consumption well below that of prior art devices.

SUMMARY OF INVENTION

The present invention relates to a frequency divider circuit particularly adapted to be formed as an integrated circuit and comprised of CMOS devices.

The divider circuit hereof is adapted to divide by 2N where N is any integer. A single stage of the present invention is comprised as 2 CMOS gates operated oppositely on clock pulses. The output of the first gate is inverted and stored and such signal is gated by the second gate to be inverted and stored. For the simplest application of the present invention, i.e., a binary divider, this second inverted signal is employed as one output of the circuit with same being inverted as the second output and such inverted signal being returned as the input of the first gate. Division by a number greater than 2 is obtained by adding stages in series, with each stage comprising two gates and two storage and inverter units as noted above, or by employing the outputs from one or more stages as the clock pulses for subsequent stages.

The present invention is primarily directed to the provision of a dynamic division network wherein the gates and inverters are provided as CMOS devices and the storage of signals is provided by the input capacitance of the inverters.

DESCRIPTION OF FIGURES

The present invention is illustrated as to particular preferred embodiments thereof in the accompanying drawings wherein.

DESCRIPTION OF PREFERRED EMBODIMENTS

Figures 1, 2A, 2B:
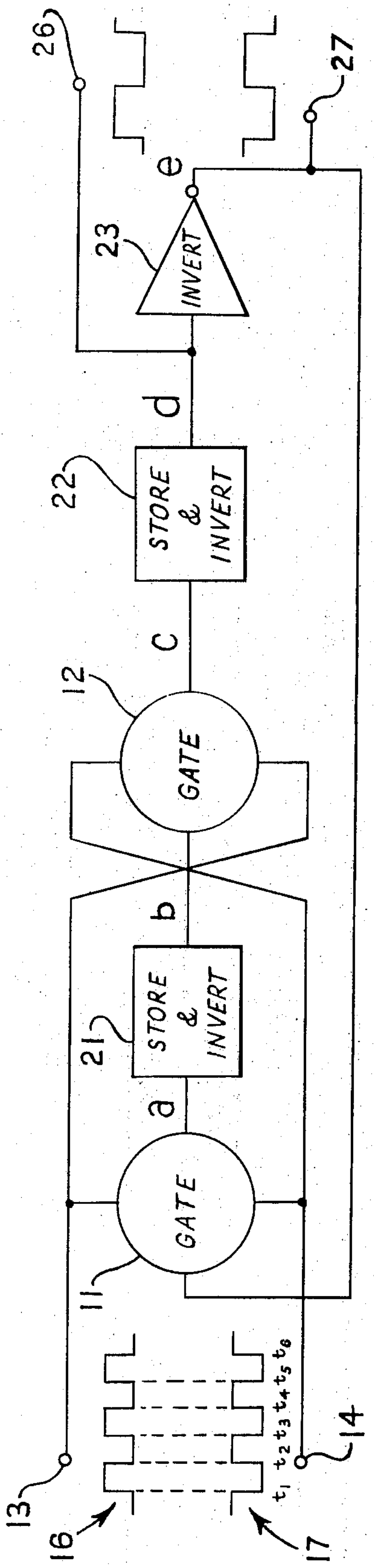
FIG. 1 is a block diagram of a binary division network in accordance with the present invention.
FIGS. 2A and 2B are truth tables applicable to the circuit of FIG. 1.

The present invention is capable of frequency division by any even number, i.e., division by 2N where N = 1, 2, 3, 4, 5, etc. Binary division, i.e., division by 2N, where N = 1, is the simplest form of the present invention and is schematically illustrated in FIG. 1. Referring now to FIG. 1, there will be seen to be provided first and second transmission gates 11 and 12 responsive to clock pulses of opposite polarity. The gates 11 and 12 are shown to be oppositely connected to clock pulse terminals 13 and 14. Terminal 13 may be considered to receive the true clock pulse as indicated at 16 and terminal 14 to receive the complement clock pulse 17. The true and complement clock pulses 16 and 17 will be seen to be identical and 180° out of phase to each other. The transmission gates 11 and 12 operate to pass signals during opposite half cycles of true clock pulses. Thus it may, for example, be considered that gate 11 will be open to transmit signals during the high portion of the clock signal 16 while the gate 12 will be open to transmit signals during the high portion of the complement clock signal 17. Thus the transmission gates 11 and 12 alternately conduct or transmit signals in accordance with application of the clock pulses. The output of the gate 11 is applied to a storage and inverting device 21 and this stored and inverted signal is gated by the transmission gate 12 for application to a second storage and inverting device 22. A binary divider is completed by application of the stored and inverted signal of 22 through an inverter 23 back to the input of the gate 11. Output signals from the circuit are obtained from the storage and inverting device 22 and from the output of the inverter 23 with such signals appearing at output terminals 26 and 27 respectively.

In order to describe operation of the circuit, it is convenient to identify nodal points, as indicated by the small letters *a*, *b*, *c*, *d* and *e* in FIG. 1, appearing at the output of gate 11, storage and inverting device 21, gate 12, storage and inverting device 22, and inverter 23, respectively. Inasmuch as the circuitry may be considered as a logic circuit, operation thereof is best established by truth tables as set forth in FIGS. 2A and 2B wherein logic "1" and logic "0" states are identified at successive time intervals. It will be appreciated that there are two circuit arrangements possible depending upon the relative polarity of the two transmission gates, i.e., as to which polarity of clock pulse operates which gate. Truth Table A of FIG. 2A relates to the circumstance wherein gate 11 operates on the high state of the true clock signal 16 and gate 12 operates on the low or "0" state of true clock signal 16, i.e., the high level of complement clock signal 17. Truth Table B of FIG 2B relates to the opposite polarity operation.

Considering now the operation of the circuit of FIG. 1 and referring both to FIG. 1 and FIG. 2A, and arbitrarily choosing a signal value at nodes *a*, *b*, *c*, *d* and *e* as indicated, i.e., 0, 1, 0, 1, 0 at time $t_0$, it will be seen that as the clock goes to the high level, i.e., "1" the zero state *d* node will be passed to node a which then remains at zero to be stored and inverted at 21. At this time gate 12 does not transmit, i.e., is off, and thus it follows that the signals at nodes *b*, *c*, *d* and *e* remain at 1, 0, 1, 0, respectively. When the clock pulse at $t_2$ goes low, i.e., the complement pulse 17 goes high, gate 11 is shut off and gate 12 is turned on to transmit signals. This causes the signal at b to be transmitted to node c which then becomes 1 and this is stored and inverted at 22 to make node d zero and this is inverted at 23 to make node e one. Inasmuch as gate 11 is off, node a remains at zero which is stored and inverted at 21 to make node b one. The next reversal of clock pulse polarity turns on gate 11 and turns off gate 12. This then causes the high level or "1" at node *e* to be transmitted to node a where it is stored and inverted to make node *b* zero. Gate 12 is off at this time so that the signal at node *c* remains high and following inversion makes the node d zero and a further inversion makes node *e* high or one. The foregoing operation repeats for each reversal of the clock polarity and this may be readily followed through the truth table A of FIG. 2A.

It will be seen that the signal at node d which is connected to the output terminal 26 is 1, 1, 0, 0, then 1, 1, etc., and this signal is inverted at 23 to appear at the other output terminal 27. Consequently it will be seen that the frequency of the input clock pulse is divided by two by the circuit of FIG. 1, i.e., during the time the clock pulse 16 varies from high to low and again high to low, the output pulse varies from high to low. In an attempt to emphasize this point the signal levels at node *d*, i.e., the output, are bracketed in pairs in the truth table A of FIG. 2A and the illustrations in FIG. 1 of clock pulses and output pulses are generally related in a 2 to 1 relationship insofar as frequency is concerned.

With regard to the opposite polarity operation of the circuit of FIG. 1, Truth Table B of FIG. 2B is applicable. It does not appear necessary to follow through each of the clock pulse level states of the circuit inasmuch as the same reasoning applies as set forth above. It is only generally noted that for the high or "1" level of the clock pulse 16, the first gate 11 does not pass signals and the second gate 12 does pass signals and vice versa. It will be noted from the Truth Tables A and B of FIG. 2 that the circuit accomplishes binary division and the only difference in the opposite polarity operation is the phase of the outputs relative to the true and complement clock signals. It is also noted that the outputs at terminals 26 and 27, i.e., nodes *d* and *e*, may be employed as true and complement clocks for subsequent division circuits for either the same invention or other circuit configurations.

Figure 3:
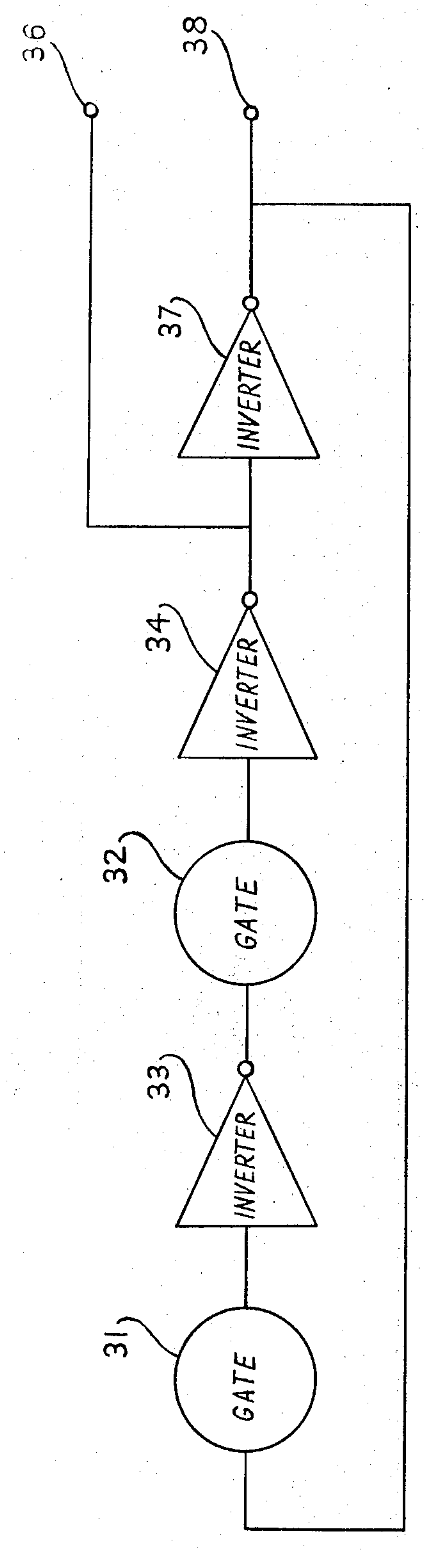
FIG. 3 is a dynamic binary division network in accordance with the present invention.

The present invention may employ either static or dynamic circuits. As an example, flip-flop circuits may be employed or inverters may be utilized. However, it is noted that, if dynamic circuits are employed, there will be a low frequency limit for normal usage determined by the rate at which electric charge leaks away from a dynamic storage node. In the dynamic version of the present invention the storage is provided by the inverter input capacitance. In FIG. 3 there is illustrated a dynamic binary divider in accordance with the present invention. In FIG. 3 the storage and inverting devices of FIG. 1 are replaced by inverters, i.e., integrated circuit elements which invert a signal in passage therethrough. More specifically, in FIG. 3 there are provided first and second transmission gate elements 31 and 32 operating upon opposite polarity clocks (not shown). An inverter 33 is connected between the output of gate 31 and the input of gate 32 with an inverter 34 connected to the output of gate 32. In the binary circuit illustrated, an output terminal 36 is connected with the output of inverter 34 which is also connected through another inverter 37 back to the input of gate 31 and also to a second output terminal 38. This second output terminal 38 provides a complement clock pulse under the circumstances wherein it is desired to operate a further division circuit from the output of the binary divider of FIG. 3. Operation of the circuit of FIG. 3 is the same as that described above in connection with FIG. 1. Consequently no further description of FIG. 3 as such is included herein.

Figure 4:
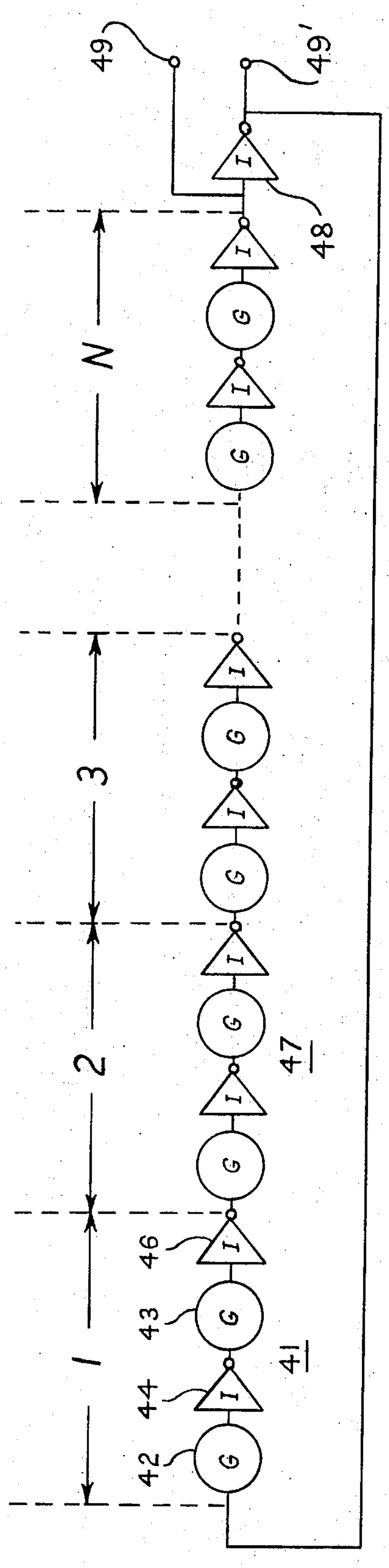
FIG. 4 is a schematic illustration of a divide by 2N network in accordance with this invention.

In FIG. 4 there is illustrated a divide by 2N network in accordance with the present invention. It will be seen in FIG. 4 that a first stage 41 is comprised as two transmission gates 42 and 43 and two inverters 44 and 46 connected in the manner of FIG. 3. The gates 42 and 43 are operated by clock pulses in the manner described above with clock connections not being illustrated. The network of FIG. 4 provides the output of the first stage 41 as the input of a second stage 47 and so on to the Nth stage. The output of the Nth stage is inverted at inverter 48 and fed back to the input of the first stage 41. The network of FIG. 4 produces a frequency division by 2N, which appears at an output terminal 49. If further frequency division is to be carried out there is also provided a complement clock output terminal 49' at which appears the inverted output signal.

As noted above, the basic binary division network hereof can be extended to divide by 2N where N = 1, 2, 3, 4, 5, etc. Aside from the output inverters, each dynamic divider has 2N internal modes which may take on $2^{2N}$ possible logic combinations. These combinations occur in groups of $2^N$ resulting in $2^N$ possible different states. By definition of division by 2N only 2N states are allowed. All states in excess of 2N are forbidden states which can produce incorrect division unless removed as by gating. This problem arises whenever N is greater than $2^{N-1}$, that is to say, when N is greater than 2. Thus, for division by factors greater than 4, additional gating means in the form of transistors are required to remove the forbidden states.

The gating network to be employed for removing forbidden or invalid states must satisfy two criteria: first, be capable of providing a transition from any sequence of invalid states into a valid state and, second, must not affect the normal sequence of valid states. In order to determine the number and location of gating means that must be employed to accomplish the foregoing, the valid and invalid states of a network in accordance with the present invention are first determined with it being understood that the invalid or forbidden states are those which do not occur in the desired division operation.

Figure 6:
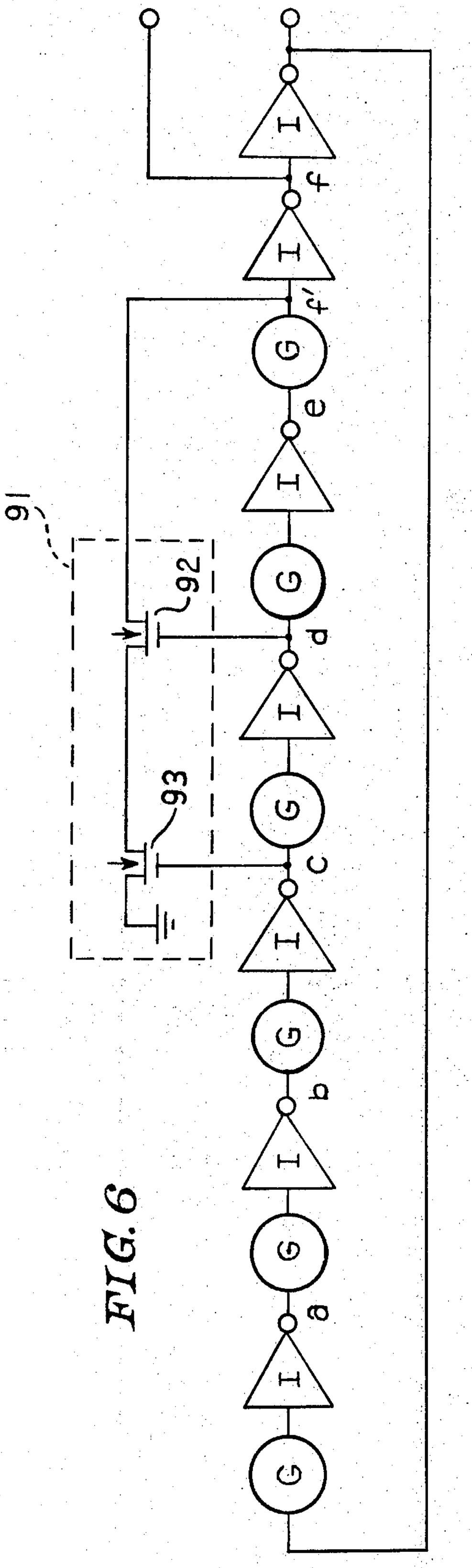
FIG. 6 is a schematic illustration of a divide by six network in accordance with this invention and including means for eliminating forbidden or invalid states from the circuitry.
Figure 6A:
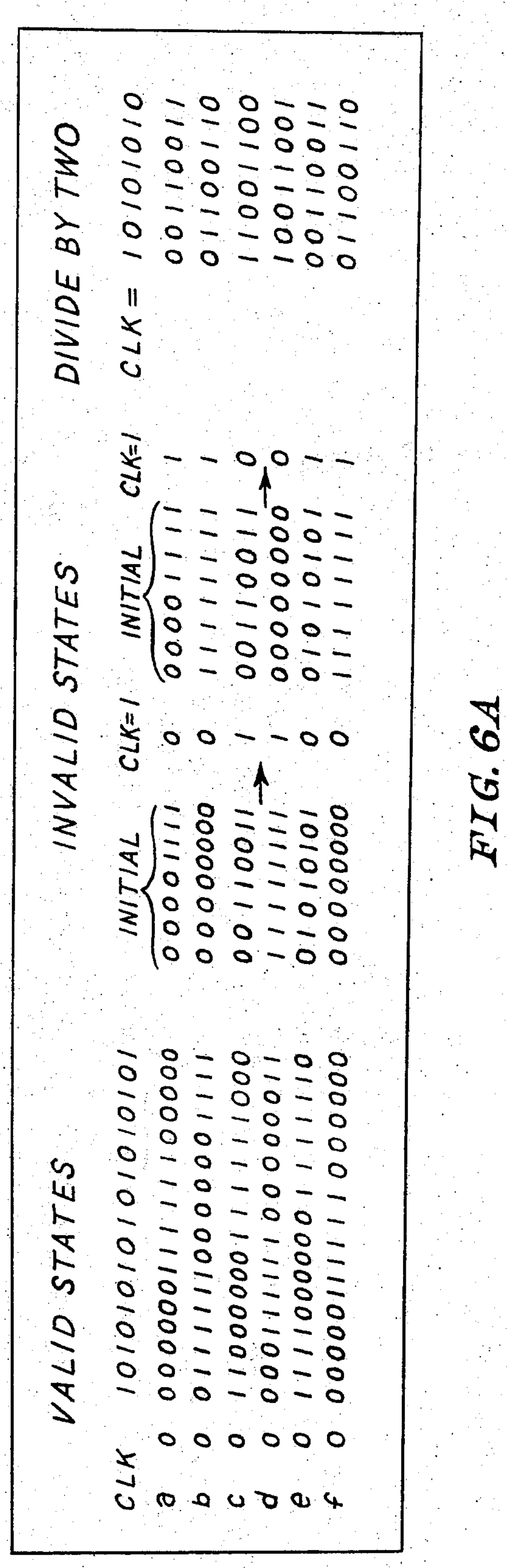
FIG. 6A is a table of nodal states of the circuit of FIG. 6 in the absence of means for removing forbidden states.

The foregoing may be further understood by an example illustrating a solution for division by 6. In this instance N is greater than 2, i.e., N = 3, and thus forbidden or invalid states must be considered. In FIG. 6 there is illustrated a division by 6 network in accordance with the present invention and incorporating gating means for removing invalid or forbidden states from the circuitry, while in FIG. 6A there is set forth a table of valid and invalid states related to the nodes identified in FIG. 6. It will be seen by referring to FIG. 6A, that, of the possible 16 invalid states, 8 of these change to the state 001100 upon receipt of a clock pulse to the circuit and the other 8 turn into the state 110011 upon the receipt of a clock pulse by the circuit. Considering further the significance of this situation, it is noted that with either of the two above-noted resultant invalid states, a divide by 2 operation produces the results indicated at the right of FIG. 6A. It will be appreciated that this sequence cannot be tolerated for a division by 6 result from the circuit of FIG. 6.

In order to preclude the foregoing possibility, the circuit of FIG. 6 is modified by employing what may be termed a NAND circuit 91 with inputs thereof connected to nodes c and d of FIG. 6 and the other terminal connected to a node *f'*. In practice this NAND circuit 91 may merely comprise a pair of N-channel MOS transistors having the gates thereof connected to the nodes *c* and *d* and connected in series between the node *f'* and ground. It will thus be seen that with this circuitry node *f'* is discharged to ground whenever both nodes *c* and *d* are at a high state, i.e., a logic 1.

The foregoing modification of FIG. 6 permits the transition from the invalid state 001100 to the valid state 101101. That this is true may be verified by following through the operation at FIG. 6 in the same manner as explained above in connection with the operation of FIG. 1 for a single binary division. It is furthermore noted that, for division by factors greater than 6, more components may be required; however, the basic approach is the same. The first and second criteria stated above must be satisfied by providing one or more discharge paths so that any initial invalid or forbidden state will be transformed into a valid state for division upon occurrence of the next clock pulse. This will then preclude the generation of further invalid or forbidden states in the circuit and return the circuit operation to the desired sequence loop.

The division network or circuit of the present invention is particularly adapted for the digital division portion of an electronic watch driven by a high frequency quartz crystal. In this type of watch circuit it is necessary to minimize power consumption because of the nature of the power source. A major source of power consumption in this application is charging and discharging of nodal capacitances. Power consumption is approximately equal to the nodal capacitants times the square of the operating voltage times the frequency. Inasmuch as the voltage and frequency are determined by other considerations, limiting power consumption is obtained by minimizing nodal capacitants and this in turn is the equivalent of minimizing the number of components and optimizing their integrated circuit layout. It is noted that in electronic watch applications digital division networks are commonly employed to divide an accurate high frequency from a crystal oscillator down to a variable frequency which is employed to drive the watch motor. The power expended in each division stage decreases from high frequency to low frequency in a geometric progression depending upon the division ratios used. It will thus be appreciated that nearly all the power consumed in a complete watch circuit is consumed in the first few high frequency stages and thus it is only necessary to restrict the nodal capacity in the first few stages in order to restrict the overall power consumption. As noted above master-slave flip-flop divider requires 16 transistors. In general the present invention requires 8N+2 transistors for a CMOS dynamic division of 2N compared to 16N transistors for a static master-slave division of 2N. It will thus be appreciated that the present invention does provide a material improvement in frequency division networks. Dynamic division networks have certain limitations at lower frequencies. However, with respect to electronic watch circuits there is no disadvantage in employing dynamic division at the higher frequencies which then produces the desired result of limiting overall power consumption. Frequency division at lower frequencies may be carried out by conventional master-slave flip-flops.

The present invention provides for frequency division with a reduced number of elements in the integrated circuit of the divider comparing the present invention to a master-slave flip-flop circuit. It is noted that for a binary divider the present invention requires only 10 transistors whereas the conventional master-slave network requires 16 transistors.

Figure 5:
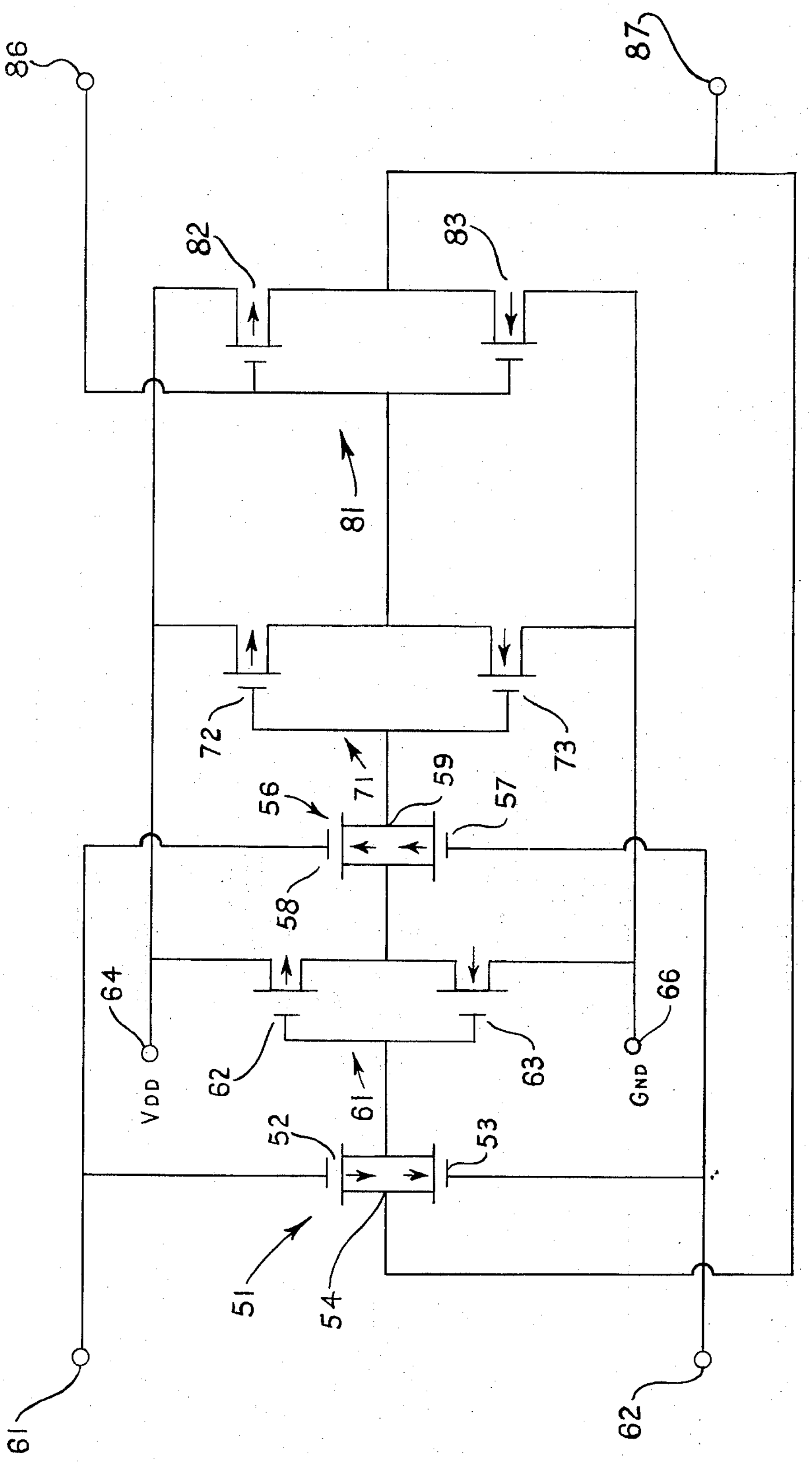
FIG. 5 is a circuit diagram of a CMOS dynamic binary division network in accordance with this invention.

Reference is now made to FIG. 5 of the drawings illustrating a dynamic CMOS binary divider in accordance with the present invention. The circuit of FIG. 5 is adapted to be formed on a single chip of semiconducting material as a monolithic integrated ciruit unit. This circuit employs CMOS units or devices and it is briefly noted that a complementary MOS, or CMOS, unit comprises a P channel and an N channel MOS unit, as is known in the art, with an interconnect between the sources, as is also known in the art. The conventions employed in FIG. 5 provide a short arrow extending away from the MOS device to identify a P channel MOS and toward the device to identify an N channel MOS. In FIG. 5 a first transmission gate corresponding to gate 31 of FIG. 3 is provided as a CMOS 51 comprising a P channel MOS 52 and N channel MOS 53 with a common connection 54. A second transmission gate corresponding to gate 32 of FIG. 3 is provided as a CMOS 56 comprised as a P channel MOS 57 and N channel MOS 58 with a common source connection 59. With regard to these CMOS's 51 and 56, it is noted that the source and drain of an MOS are substantially interchangeable and thus it is considered herein that the CMOS devices are each originally formed with common source connections and in accordance with the present invention may also be formed with integral common drain connections to form the transmission gates corresponding to the gates 31 and 32 of FIG. 3.

There are provided clock terminals 61 and 62 with the first terminal 61 adapted to receive true clock pulses and the terminal 62 to receive complement clock pulses. Terminal 61 is connected to the gate of the P channel MOS 52 and to the gate of the N channel MOS 58. The complement clock terminal 62 is connected to the gate of the N channel MOS 53 and to the P channel MOS 57.

In addition to the transmission gates comprised as the CMOS's 51 and 56 there is also provided three inverters corresponding to the inverters 33, 34 and 37 of FIG. 3, and herein provided as CMOS elements or devices 61, 71 and 81. The gate output at the common drain connection of CMOS 51 is connected to the gates of MOS transistor 62 and 63 of CMOS 61. The transistor 62 of CMOS 61 is a P channel MOS and has the source thereof connected to a positive power supply terminal 64 also labeled Vdd in FIG. 5 as a source of positive drain voltage. The N channel MOS transistor 63 has the source thereof connected to a ground terminal 66 and the common source connection of the CMOS 61 is connected to the common drain connection of the CMOS gate 56. The second inverter 71 is identical to the first inverter described above, including a P channel MOS transistor 72 having the source connected to the terminal 64 and N channel MOS transistor 73 having the source connected to the ground terminal 66, with a common connection between the gates of these transistors connected to the common source connection 59 of the CMOS gate 56. These four units, i.e., the two transmission gates and two inverters, comprise a binary divider in accordance with the present invention and there is further included the additional inverter 81 to invert the output of the divider. This CMOS inverter 81 is comprised of a P channel MOS transistor 82 having the source thereof connected with the terminal 64 and an N channel MOS transistor 83 having the source connected to ground terminal 66. A common connection between the gates of the transistors 82 and 83 is connected to the common drain connection of transistors 72 and 73 of CMOS 71 and also to an output terminal 86. The common drain connection of transistors 82 and 83 is connected to a second output terminal 87 and also back to the common source connection of CMOS 51.

Considering now the operation of the above-described circuit of FIG. 5, it is noted that application of a negative clock pulse to the P channel 52 of CMOS gate 51 will cause this transistor to conduct and the simultaneous application of a positive complementary clock pulse to the N channel transistor 53 will cause this transistor to conduct. Thus, in this situation the gate 51 is conducting to pass either a negative or positive pulse from the input to the output thereof. It is noted that the combination of P channel and N channel MOS transistors in parallel is advantageous in providing for the gate passing either positive or negative pulses without substantial voltage limitation. Considering, for example, a positive signal to be passed by the gate 51, this signal, when applied to the gates of transistors 62 and 63, will cause the N channel transistor 63 to conduct and thereby apply a ground or negative signal to the gate 56. It will thus be seen that the CMOS device 61 operates as an inverter.

The transmission gate 56 operates oppositely from the gate 51 in that a positive clock pulse applied to the N channel transistor 58 thereof causes same to conduct and the simultaneous application of a negative complementary clock pulse to the P channel transistor 57 causes same to conduct. Thus the gates 51 and 56 will be seen to alternately conduct when a train of clock pulses and complementary clock pulses are applied thereto. This operation is the same as the operation of the circuits of FIGS. 1 and 3 described above. The CMOS inverter 71 operates in the same manner as the inverter 61. Referring again to the Truth Tables of FIG. 2, it will be seen that the output signal at terminal 86 of the circuit of FIG. 5 has a frequency or period of repetition which is one-half the frequency of the clock pulses applied to the circuit. Thus this circuit accomplishes binary division. It is noted that, although the operation of the present invention has been described in connection with digital signals, i.e., pulse signals, it is also possible for the invention to operate with other signals such as sine wave signals.

The CMOS binary divider network of FIG. 5 produces frequency division with a minimum of circuit elements and a minimization of power consumption. Additionally, this circuit is capable of being formed as an integrated circuit with a material reduction in physical size from conventional binary divider circuits. It will be appreciated that the circuit of FIG. 5 is particularly adapted to integrated circuit techniques and in an electronic watch application there may be achieved up to a 70 percent reduction in power consumption and a 25 percent reduction in overall integrated circuit size.

Although the present invention has been described and illustrated with respect to particular preferred embodiments thereof, it is not intended to limit the invention by the precise terms of description or details of illustration. It will be apparent to those skilled in the art that variations and modifications may be made within the scope of the present invention.

What is claimed is:

1. A frequency divider circuit including first and second transmission gates operated by clock pulses with one gate transmitting a signal applied thereto during the presence of a clock pulse and the other transmitting a signal applied thereto in the absence of a clock pulse, clock pulse terminals adapted to receive clock pulses and connected to said gates for operating the gates, a first storage and signal inverting unit connected between the output of the first gate and the input of the second gate, a second storage and signal inverting unit connected between the output of the second gate and a first output terminal, an inverter connected between the output of said second storage and signal inverting unit and a second output terminal, and means connecting said second output terminal to the input of said first gate whereby signals across the output terminals have a frequency of one-half the frequency of said clock pulses.

2. The circuit of claim 1 in which each of said transmission gates comprises a single CMOS device having said clock pulse terminals connected to the gates thereof, and each of said signal storage and inverter units comprising a single CMOS device with the outputs of the transmission gates connected to the two gates of the respective units.

3. The divider circuit of claim 2 further defined by said inverter comprising a single CMOS device having the gates thereof connected together and to the output of the second signal storage and inverter unit and the common drain connection connected to the second output terminal.

4. An integrated circuit binary divider circuit comprising five CMOS devices formed as a single unit and each having an N channel gate, a P channel gate, a common drain connection and a source connection, a pair of clock terminals connected one to each of the gates of said first CMOS device and connected in opposite relation one to each of the gates of said third CMOS device, said first and third CMOS devices each having the drain connections connected together to form a common connection, power supply terminals connected across the source terminals of said second, fourth and fifth CMOS devices, means connecting together the gates of said second and fourth CMOS devices and connecting same to a first common drain connection of said first and third CMOS devices, respectively, means connecting the common drain connection of said second CMOS device to a common source connection of said third CMOS device, means connecting together the gates of said fifth CMOS device and connecting same to the common drain connection of said fourth CMOS device, a pair of output terminals connected between the common drain connections of said fourth and fifth CMOS devices, and means connecting the common drain connection of said fifth CMOS device to the common connection of said first CMOS device whereby the frequency of signals at said output terminals is one-half the frequency of signals at said clock terminals.

5. A divide by six frequency dividing network comprising a first stage having:

first and second transmission gates with the first gate transmitting signals applied to the input thereof during the presence of a gate pulse thereat and the second gate transmitting a signal applied to the input during the absence of a gate pulse thereat, clock pulse terminals connected one to each of said gates and adapted to receive complimentary square wave gate pulses whose frequency is to be divided, first and second storage and inverting units with the first unit connected between the output of the first gate and the input of the second gate and the second unit being connected between the output of the second gate and an output terminal;

second and third stages substantially the same as said first stage and connected in series with said first stage;

an inverter connected between the output of the third stage and the input of the first gate of the first stage; and gating means connecting nodal points in the circuitry for eliminating forbidden states therefrom in the frequency division by six whereby the frequency of the signal at the output of the third stage is one sixth of the frequency of input gating pulses to the first stage.

6. The network of claim 5 further defined by said gating means comprising first and second gating transistors connected in series between electrical ground and the output of the second gate of said third stage, a connection between a gating element of a first of said gating transistors and the input of the second gate of said second stage, and a connection between a gating element of a second of said gating transistors and the input of the first gate of said third stage.

7. A frequency divider circuit comprising first and second transmission gates, first and second clock pulse terminals adapted to receive clock and complementary clock pulses respectively and connected to said first and second gates for alternately operating said gates, first and second storage and inverting units with the first unit connected between the output of the first gate and the input of the second gate and the second unit connected to the output of the second gate, third and fourth transmission gates connected to said clock terminals for operation of the third gate at the same time as the first gate and the fourth gate at the same time as the second gate, third and fourth storage and inverting units with the third unit connected between the third and fourth gates and the fourth unit connected to the output of the fourth gate, means connecting the output of the second storage and inverting unit to the input of the third gate, first and second output terminals with the first terminal connected to the output of said fourth storage and inverting unit, an inverter connecting the first output terminal to the second output terminal, and means connecting said second output terminal to the input of the first gate whereby the frequency of signals at the output terminals is one quarter the frequency of said clock pulses.

* * * * *